United States Patent
Eyole et al.

(10) Patent No.: US 11,847,460 B2
(45) Date of Patent: *Dec. 19, 2023

(54) ADAPTIVE LOAD COALESCING FOR SPATIALLY PROXIMATE LOAD REQUESTS BASED ON PREDICTED LOAD REQUEST COALESCENCE BASED ON HANDLING OF PREVIOUS LOAD REQUESTS

(71) Applicant: Arm Limited, Cambridge (GB)

(72) Inventors: Mbou Eyole, Soham (GB); Michiel Willem Van Tol, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,062

(22) Filed: Mar. 24, 2021

(65) Prior Publication Data

US 2021/0349721 A1    Nov. 11, 2021

(30) Foreign Application Priority Data

May 6, 2020   (GB) ..................................... 2006684

(51) Int. Cl.
*G06F 9/38*   (2018.01)
*G06F 9/30*   (2018.01)

(52) U.S. Cl.
CPC ........ *G06F 9/3836* (2013.01); *G06F 9/30043* (2013.01); *G06F 9/3838* (2013.01)

(58) Field of Classification Search
CPC ...... G06F 9/3836; G06F 9/30043; G06F 9/34; G06F 9/345; G06F 9/3824; G06F 9/3826; G06F 9/3838

See application file for complete search history.

(56) References Cited

U.S. PATENT DOCUMENTS 5,898,852 A * 4/1999 Petolino, Jr. .......... G06F 9/3832
                                                              712/E9.047
6,249,851 B1 * 6/2001 Richardson ......... G06F 12/0859
                                                              711/146

(Continued)

FOREIGN PATENT DOCUMENTS

WO    2012/123061 A1   9/2012
WO    2012/123061 A9   9/2012

OTHER PUBLICATIONS

Solomon et al., "Micro-Operation Cache: A Power Aware Frontend for Variable Instruction Length ISA", ACM, 2001, pp. 4-9.*

(Continued)

*Primary Examiner* — David J. Huisman
(74) *Attorney, Agent, or Firm* — NIXON & VANDERHYE P.C.

(57) ABSTRACT

Apparatuses and methods for handling load requests are disclosed. In response to a load request specifying a data item to retrieve from memory, a series of data items comprising the data item identified by the load request are retrieved. Load requests are buffered prior to the load requests being carried out. Coalescing circuitry determines for the load request and a set of one or more other load requests buffered in the pending load buffer circuitry whether an address proximity condition is true. The address proximity condition is true when all data items identified by the set of one or more other load requests are comprised within the series of data items. When the address proximity condition is true, the set of one or more other load requests are suppressed. Coalescing prediction circuitry generates a coalescing prediction for each load request based on previous handling of load requests by the coalescing circuitry.

16 Claims, 7 Drawing Sheets

(56) References Cited

U.S. PATENT DOCUMENTS

Figure 1:
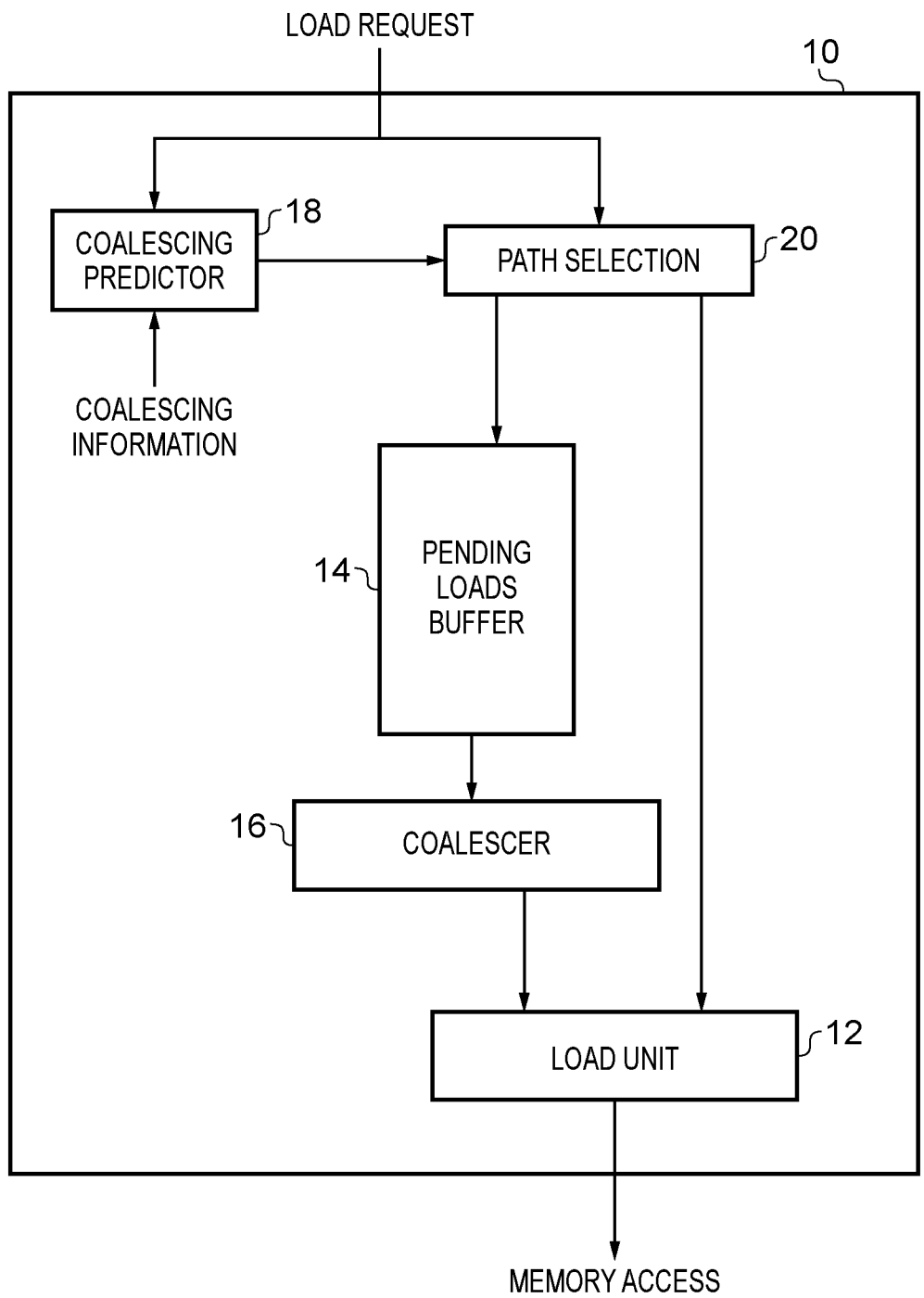

| | | | |
|---|---|---|---|
| 6,336,168 B1 | 1/2002 | Frederick, Jr. et al. | |
| 6,490,674 B1* | 12/2002 | Arnold | G06F 9/3867 712/216 |
| 7,032,101 B2* | 4/2006 | Gschwind | G06F 9/3838 712/214 |
| 7,492,368 B1* | 2/2009 | Nordquist | G06F 13/161 345/531 |
| 8,874,908 B2* | 10/2014 | Raudaschl | G06F 21/6218 713/184 |
| 9,158,573 B2* | 10/2015 | Busaba | G06F 9/467 |
| 9,946,666 B2* | 4/2018 | Heinrich | G06F 12/00 |
| 10,282,371 B1* | 5/2019 | Gaither | G06F 16/1748 |
| 2004/0088501 A1 | 5/2004 | Collard et al. | |
| 2006/0236036 A1* | 10/2006 | Gschwind | G06F 12/0862 711/137 |
| 2008/0086594 A1* | 4/2008 | Chang | G06F 9/3826 711/118 |
| 2009/0240895 A1* | 9/2009 | Nyland | G06F 9/3891 711/149 |
| 2014/0047218 A1* | 2/2014 | Jackson | G06F 9/3875 712/217 |
| 2014/0258667 A1 | 9/2014 | Sudhakar | |
| 2015/0169361 A1 | 6/2015 | Busaba et al. | |
| 2015/0347138 A1* | 12/2015 | Gschwind | G06F 9/3859 712/239 |
| 2016/0267072 A1* | 9/2016 | Kappler | G06F 40/289 |
| 2017/0277542 A1 | 9/2017 | Fernsler et al. | |
| 2018/0232310 A1* | 8/2018 | Chang | G06F 12/0895 |
| 2020/0004536 A1* | 1/2020 | Shevgoor | G06F 9/30145 |
| 2020/0160401 A1* | 5/2020 | Hassan | G06Q 30/0272 |
| 2020/0310814 A1* | 10/2020 | Kothinti Naresh | G06F 9/3834 |
| 2022/0035633 A1* | 2/2022 | Cain, III | G06F 9/30047 |

OTHER PUBLICATIONS

Sha et al., "Scalable Store-Load Forwarding via Store Queue Index Prediction", Proceedings of the 38th Annual IEEE/ACM International Symposium on Microarchitecture (MICRO'05), 2005, 12 pages.*

Jin et al., "Reducing Cache Traffic and Energy with Macro Data Load", ACM, 2006, pp. 147-150.*

Search Report for GB2006684.1, dated Oct. 21, 2020, 4 pages.

Orosa et al., "AVPP: Address-first Value-next Predictor with Value Prefetching for Improving the Efficiency of Load Value Prediction", ACM Transactions on Architecture and Code Optimization, vol. 1, No. 1, article 1, Sep. 2018, 25 pages.

Sleiman et al., "Efficiently Scaling Out-of-Order Cores for Simultaneous Multithreading", 2016 ACM/IEEE 43rd Annual International Symposium on Computer Architecture, IEEE, Jun. 18-22, 2016, 13 pages.

U.S. Appl. No. 17/755,133, filed Apr. 21, 2022, Eyole et al.

UKIPO Communication dated Feb. 9, 2021 for GB Application 2013205.6, 7 pages.

Tae Jun Ham, et al., "Decoupling Data Supply from Computation for Latency-Tolerant Communication in Heterogeneous Architectures", ACM Trans. Archit. Code Optim. 14, 2, Article 16 (Jun. 2017), 27 pages; DOI: http://dx.doi.org/10.1145/3075620.

EPO Communication dated Aug. 14, 2020 for EP Application 19386044.2, 11 pages.

James E. Smith, "Decoupled Access/Execute Computer Architectures", Department of Electrical and Computer Engineering University of Wisconsin-Madison, Madison, Wisconsin 53706; 1982, 8 pages.

Trevor E. Carlson, et al., "The Load Slice Core Microarchitecture", ISCA '15, Jun. 13-17, 2015, Portland, OR, USA, 13 pages.

* cited by examiner

ADAPTIVE LOAD COALESCING FOR SPATIALLY PROXIMATE LOAD REQUESTS BASED ON PREDICTED LOAD REQUEST COALESCENCE BASED ON HANDLING OF PREVIOUS LOAD REQUESTS

This application claims priority to GB Patent Application No. 2006684.1 filed 6 May 2020, the entire contents of which is hereby incorporated by reference.

The present techniques relate to data processing. More particularly they relate to the handling of load requests in a data processing apparatus.

A data processing apparatus may be provided with the capability, when performing load operations, to coalesce certain loads together which have been identified as having an appropriate degree of spatial proximity, such that they can be serviced simultaneously. More particularly it may be identified that the spatial proximity between two load requests is sufficiently close, that only one memory access need be carried out which will return the data requested by each of the spatially proximate load requests.

At least some examples provide an apparatus comprising: load handling circuitry responsive to a load request specifying a data item to retrieve from memory a series of data items comprising the data item identified by the load request; pending load buffer circuitry to buffer load requests prior to the load requests being carried out by the load handling circuitry to retrieve from memory data items specified by the load requests; coalescing circuitry to determine for the load request and a set of one or more other load requests buffered in the pending load buffer circuitry whether an address proximity condition is true, wherein the address proximity condition is true when all data items identified by the set of one or more other load requests are comprised within the series of data items, wherein the coalescing circuitry is responsive to the address proximity condition being true to suppress handling by the load handling circuitry of the set of one or more other load requests; and coalescing prediction circuitry to generate a coalescing prediction for the load request based on previous handling of load requests by the coalescing circuitry.

At least some examples provide a method of data processing comprising: buffering load requests prior to the load requests being carried out to retrieve from memory data items specified by the load requests, wherein carrying out a load request specifying a data item comprises retrieving from memory a series of data items comprising the data item identified by the load request; determining for the load request and a set of one or more other buffered load requests whether an address proximity condition is true, wherein the address proximity condition is true when all data items identified by the set of one or more other load requests are comprised within the series of data items; suppressing carrying out of the set of one or more other load requests when the address proximity condition is true; and generating a coalescing prediction for the load request based on previous handling of load requests.

At least some examples provide an apparatus comprising: means for buffering load requests prior to the load requests being carried out to retrieve from memory data items specified by the load requests, wherein carrying out a load request specifying a data item comprises retrieving from memory a series of data items comprising the data item identified by the load request; means for determining for the load request and a set of one or more other buffered load requests whether an address proximity condition is true, wherein the address proximity condition is true when all data items identified by the set of one or more other load requests are comprised within the series of data items; means for suppressing carrying out of the set of one or more other load requests when the address proximity condition is true; means for generating a coalescing prediction for the load request based on previous handling of load requests.

Figure 2A:
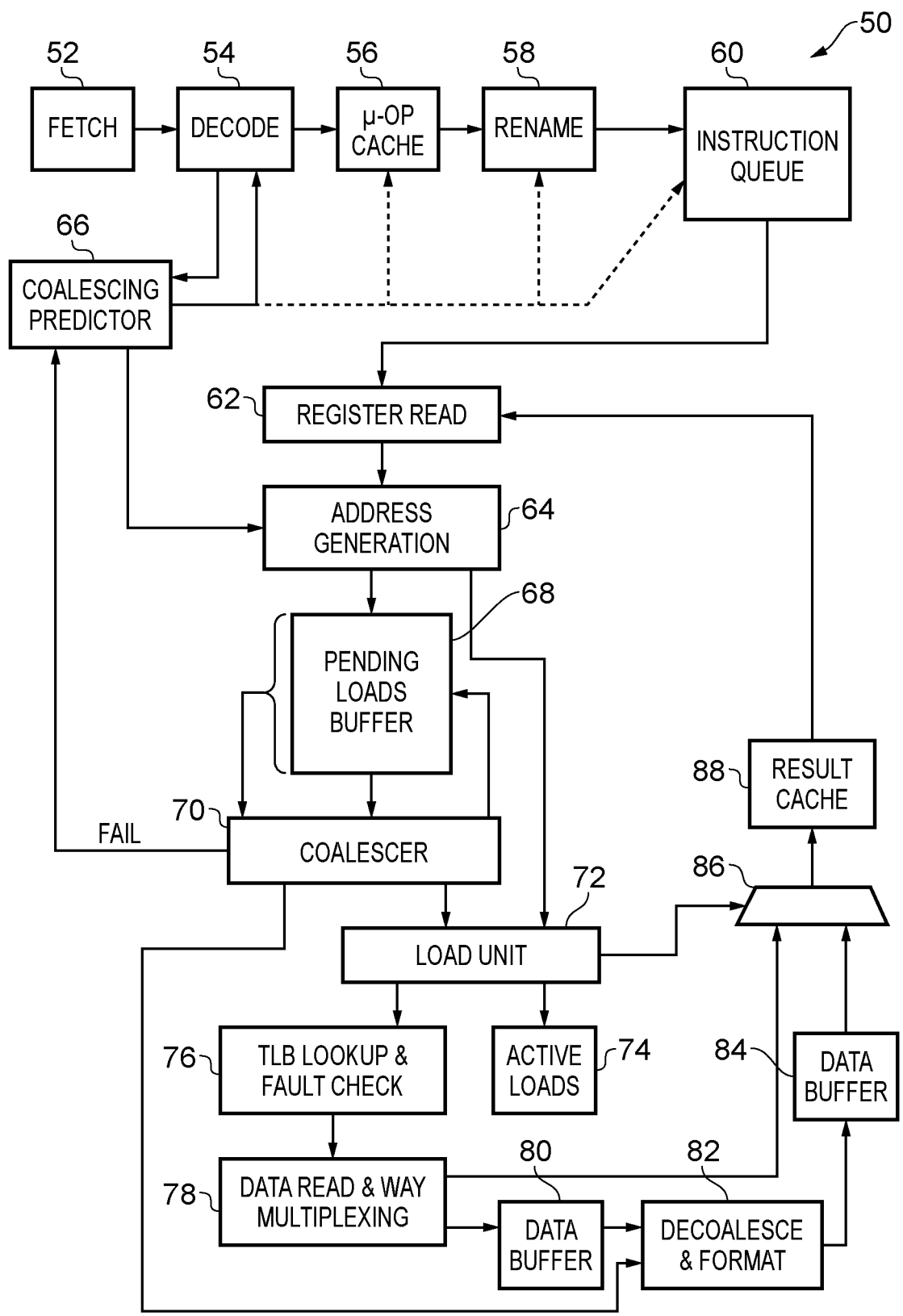
Figure 2B:
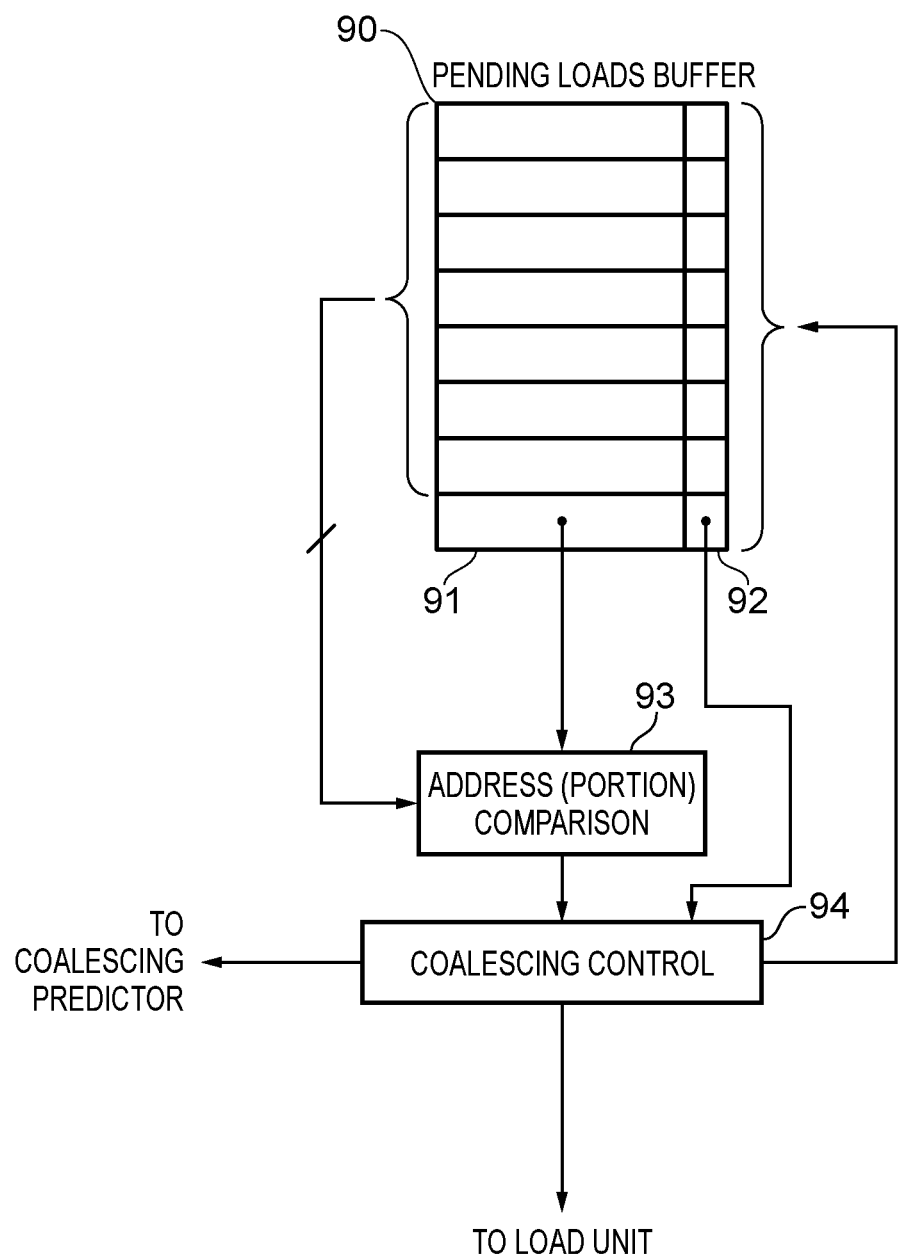
Figure 3:
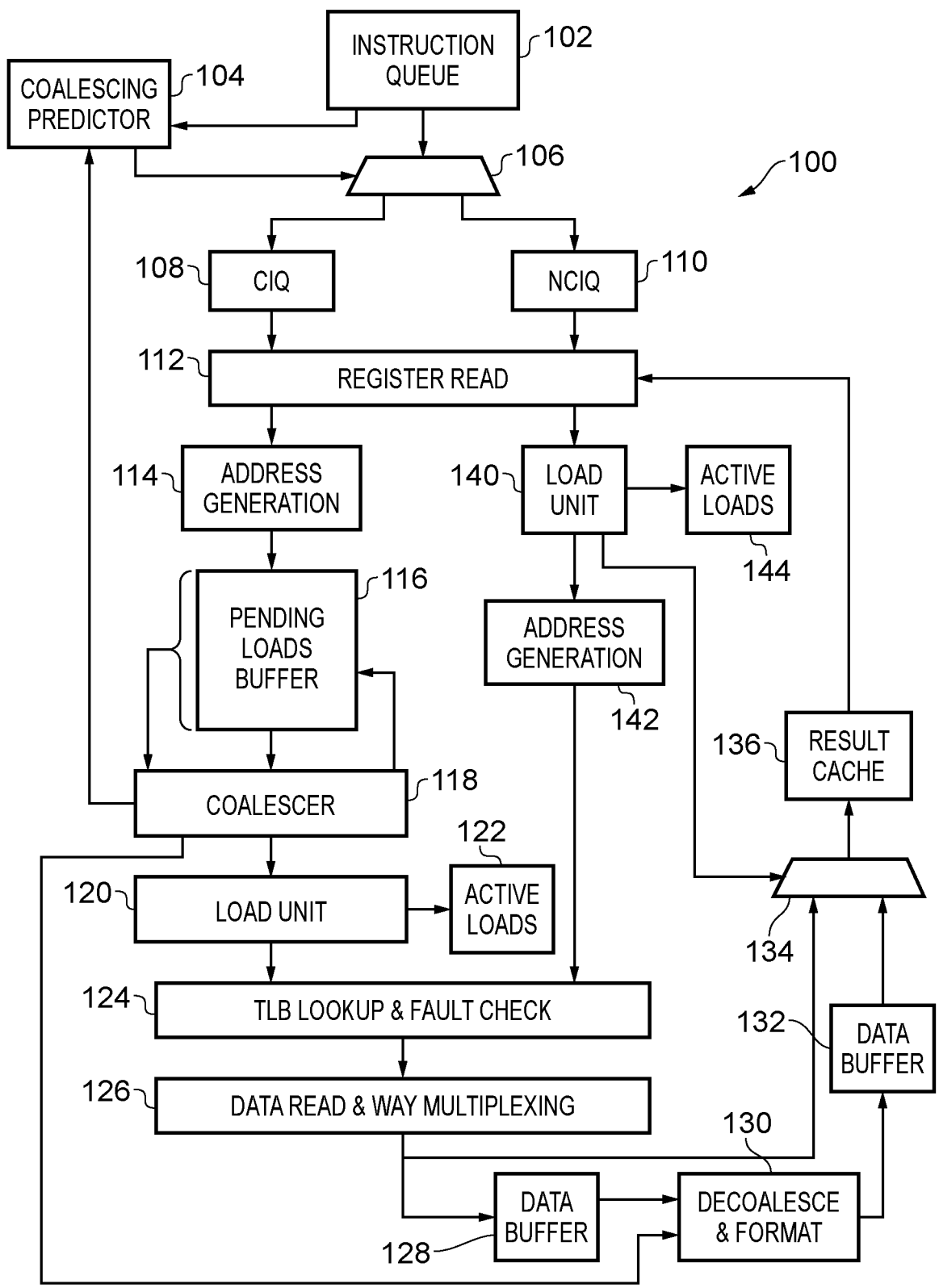
Figure 4A:
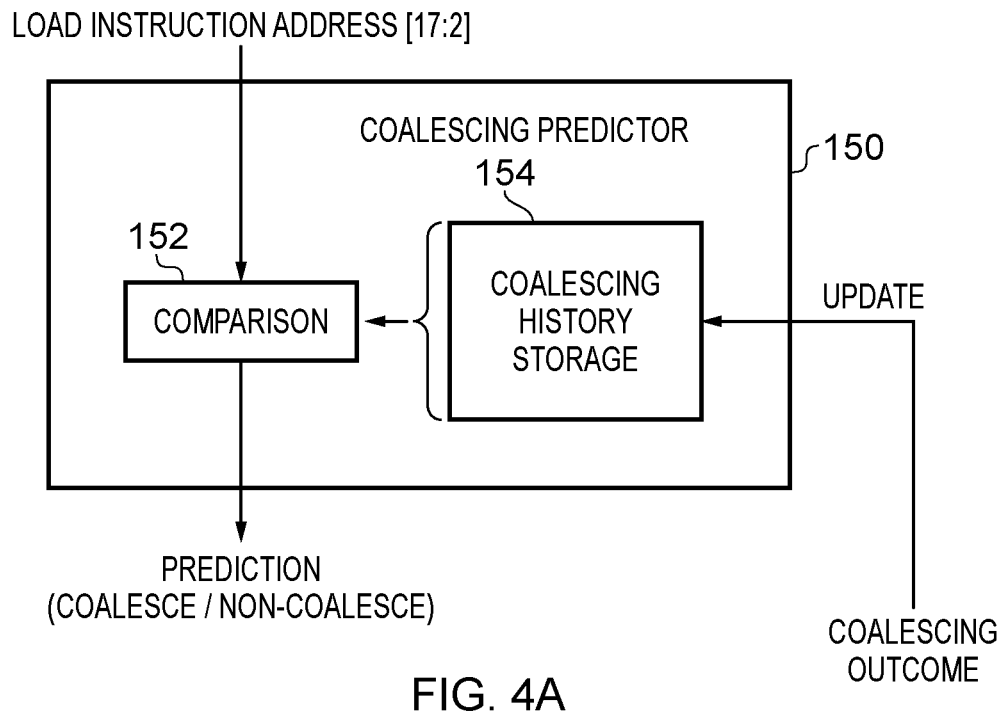
Figure 4B:
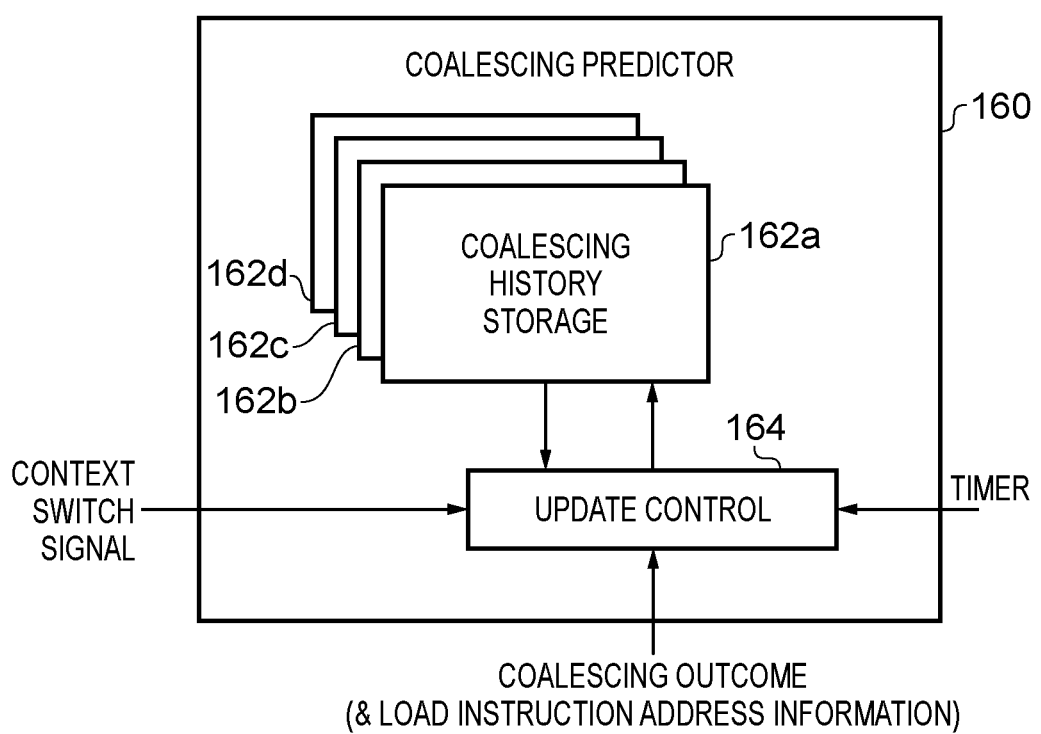
Figure 5A:
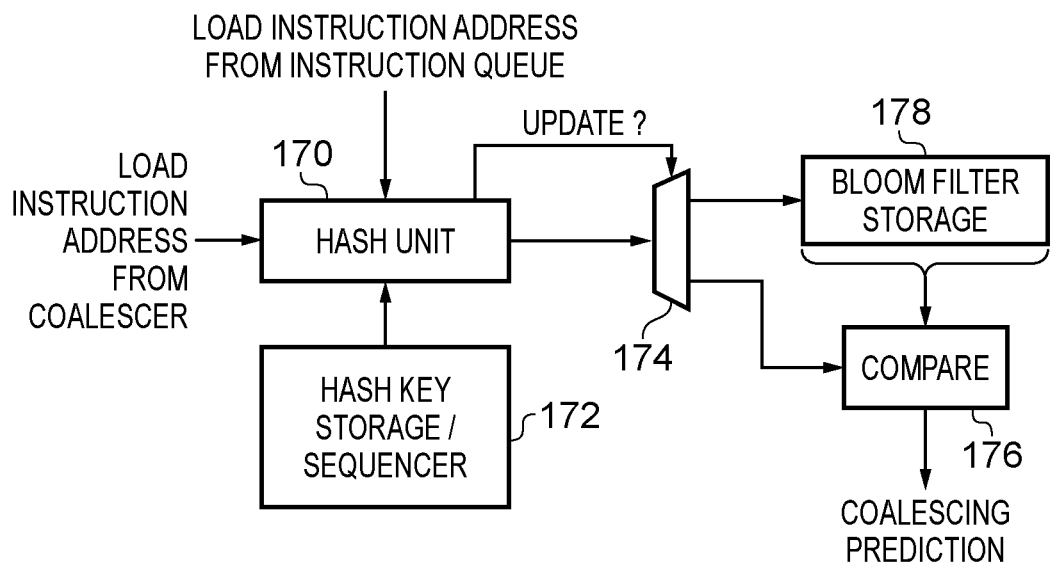
Figure 5B:
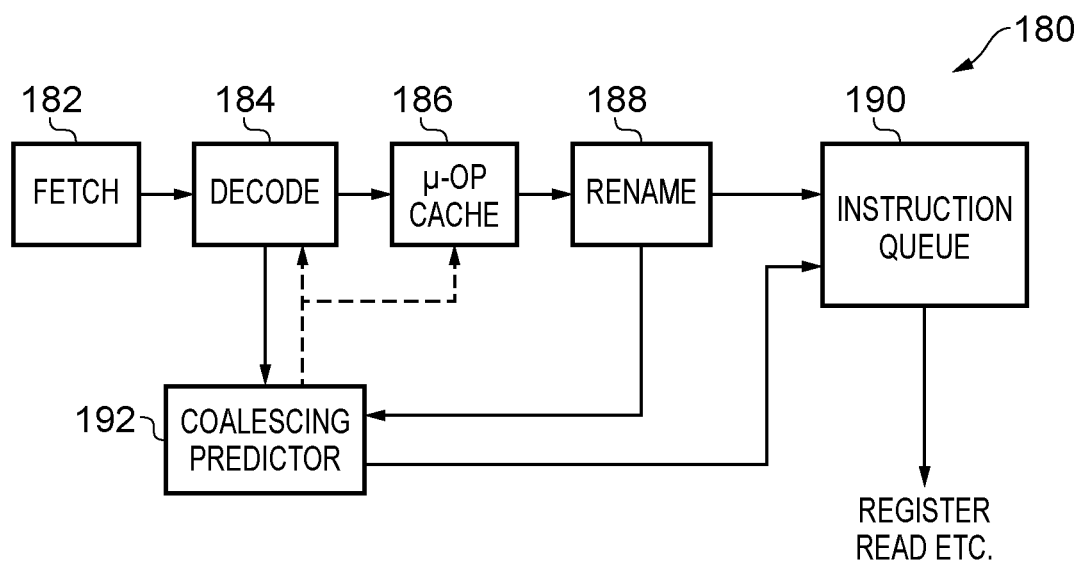
Figure 6:
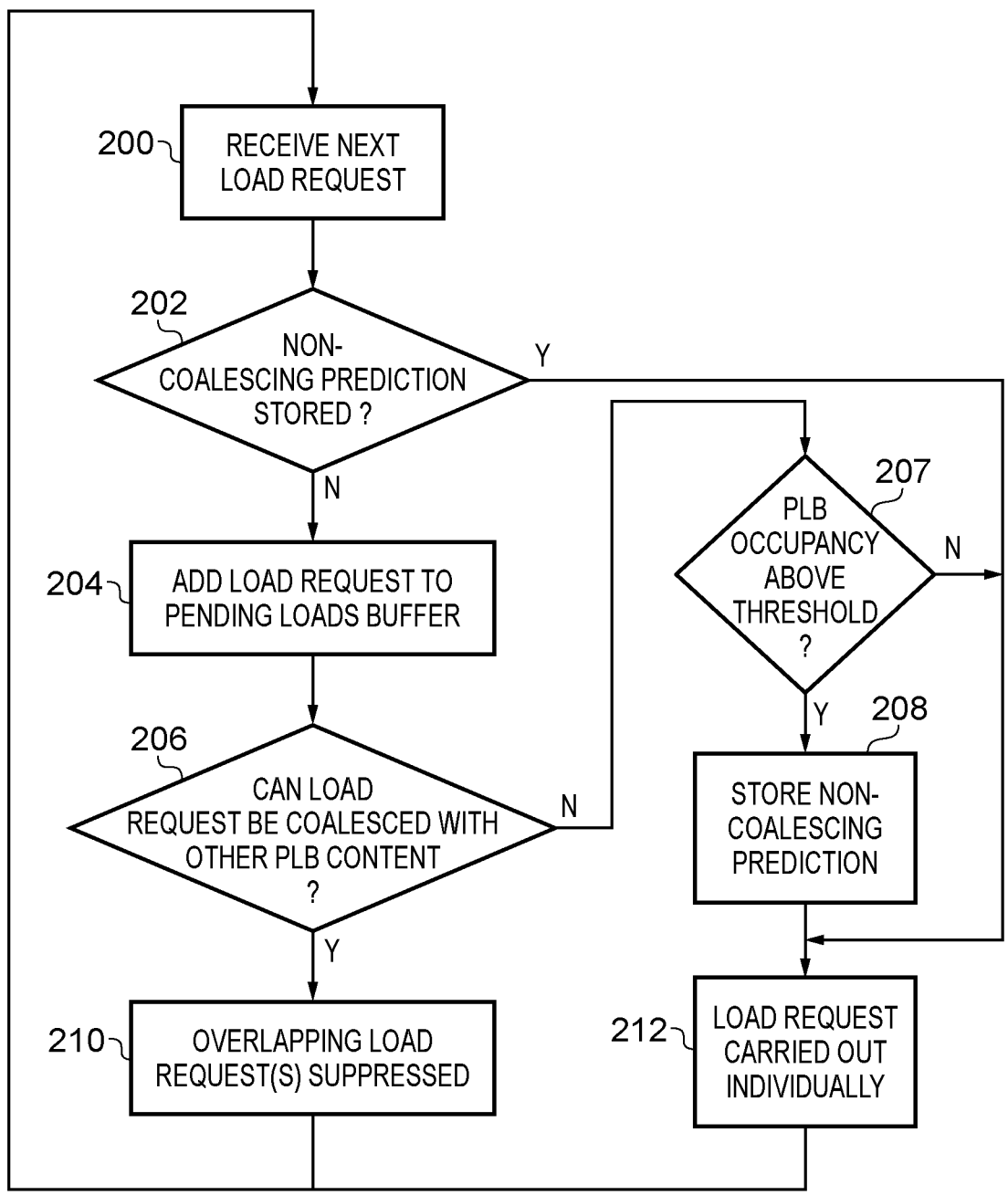

The present techniques will be described further, by way of example only, with reference to embodiments thereof as illustrated in the accompanying drawings, to be read in conjunction with the following description, in which:

FIG. 1 schematically illustrates an apparatus according to some example embodiments comprising load handling circuitry which has the ability to coalesce some pending loads;

FIG. 2A schematically illustrates an apparatus according to some example embodiments comprising load handling circuitry which has the ability to coalesce some pending loads;

FIG. 2B schematically illustrates the interaction of a pending loads buffer and coalescing circuitry according to some example embodiments;

FIG. 3 schematically illustrates an apparatus according to some example embodiments comprising load handling circuitry which has the ability to coalesce some pending loads;

FIG. 4A schematically illustrates coalescing prediction circuitry according to some example embodiments;

FIG. 4B schematically illustrates coalescing prediction circuitry according to some example embodiments;

FIG. 5A schematically illustrates hash generation circuitry and Bloom filter circuitry in some example embodiments;

FIG. 5B schematically illustrates an apparatus according to some example embodiments; and FIG. 6 is a flow diagram showing a sequence of steps which are taken according to some example embodiments.

In one example herein there is an apparatus comprising: load handling circuitry responsive to a load request specifying a data item to retrieve from memory a series of data items comprising the data item identified by the load request; pending load buffer circuitry to buffer load requests prior to the load requests being carried out by the load handling circuitry to retrieve from memory data items specified by the load requests; coalescing circuitry to determine for the load request and a set of one or more other load requests buffered in the pending load buffer circuitry whether an address proximity condition is true, wherein the address proximity condition is true when all data items identified by the set of one or more other load requests are comprised within the series of data items, wherein the coalescing circuitry is responsive to the address proximity condition being true to suppress handling by the load handling circuitry of the set of one or more other load requests; and coalescing prediction circuitry to generate a coalescing prediction for the load request based on previous handling of load requests by the coalescing circuitry.

Coalescing load requests is based on an identification that the load requests concerned are sufficiently spatially proximate (in terms of the memory locations which they reference) that they can be serviced by one "coalesced" memory access. This spatial proximity may be referred to herein as an "address proximity condition" being true for the load requests concerned. The opportunity to coalesce load requests in this manner arises in a system in which load handling circuitry, in response to a load request specifying a data item to be retrieved from memory, typically retrieves more than just the data item itself as part of the memory access triggered. This is due to the efficiencies which are gained by constraining memory accesses to particular data sizes, for example aligning this with the cache line size in the system (although the present techniques are not limited to this particular choice and other granules of memory are equally applicable). Generally, although the use of coalescing circuitry to determine whether pending load requests might be coalesced has a certain cost, there may be circumstances in which, despite the increase in latency incurred through the processing of the coalescing circuitry, this may be offset by an improvement in memory access bandwidth which can be substantial enough to obtain an overall performance increase, e.g. where a significant proportion of load instructions can be coalesced. Nevertheless the inventors of the present techniques have recognised that when only a relatively small number of load instructions can be successfully merged (coalesced), the increase in latency due to the additional coalescing processing may outweigh the benefit that can be obtained. The present techniques therefore propose the provision of coalescing prediction circuitry, which is arranged to generate a prediction of whether a given load request will be coalesced with other load requests, based on the previous handling of load requests by the coalescing circuitry. This coalescing prediction can then be made use of by the apparatus in a variety of ways, for example to modify its behaviour with respect to specific load requests.

In some embodiments the coalescing circuitry is responsive to a coalescing prediction of not-coalescing to suppress handling of the load request by the coalescing circuitry. Thus, as one possible response to the generated prediction that the load request will not coalesce with other load requests, the coalescing circuitry can avoid handling this load request and therefore save the processing effort when it is not expected that the load request will coalesce.

The gathering of information on previous handling of load requests by the coalescing circuitry may be provided in a variety of ways, but in some embodiments the apparatus further comprises a feedback path from the coalescing circuitry to the coalescing prediction circuitry, wherein the coalescing circuitry is responsive to a validity of the address proximity condition to signal to the coalescing prediction circuitry via the feedback path a coalescing outcome dependent on the validity of the address proximity condition for the load request. Accordingly, on the basis of the determination of the address proximity condition by the coalescing circuitry with respect to a load request the coalescing circuitry can signal to the coalescing prediction circuitry a coalescing outcome. Depending on the configuration this could be positively or negatively configured, i.e. it may be arranged for the coalescing circuitry to specifically indicate load requests which have not coalesced to the coalescing prediction circuitry or alternatively the coalescing circuitry may signal those load requests which have coalesced to the coalescing prediction circuitry. The coalescing prediction circuitry can then appropriately gather this information on which it can base its future predictions.

The coalescing prediction circuitry may be variously configured, but in some embodiments the coalescing prediction circuitry comprises coalescing history storage to hold content dependent on the previous handling of load requests by the coalescing circuitry, and the coalescing prediction circuitry is arranged to generate the coalescing prediction for the load request based on the content of the coalescing history storage.

The content held by the coalescing history storage may take a variety of forms, but in some embodiments the content held by the coalescing history storage comprises a probabilistic data structure. In some embodiments this content may explicitly correspond to the previous coalescing history outcomes, but in other embodiments it may also be reduced in a probabilistic fashion. A probabilistic history storage reduces the storage capacity required.

In some example embodiments the coalescing history storage comprises a Bloom filter.

In some embodiments the apparatus further comprises a hash generation unit to generate content of the probabilistic data structure, wherein the hash generation unit comprises a hash sequencer to generate the content of the probabilistic data structure in multiple hashing stages. Arranging the hash sequencer to generate the content of the probabilistic data structure in multiple hashing stages may allow a simpler hardware implementation.

Where a probabilistic data structure, such as a Bloom filter, depends on an evolving data structure which captures the coalescing history asymmetrically, i.e. the Bloom filter may be arranged to provide information on whether a particular load is certainly capable of being coalesced or whether it might (but it is not certain) not coalesce, the evolving nature of the data structure means that the rate of false positives (e.g. coalescing loads being flagged as non-coalescing) will generally increase with the passing of time. Accordingly in some embodiments the apparatus comprises reset circuitry to reset the content of the coalescing history storage in response to at least one of: elapse of a predetermined time period; receipt of a context switch indication; and/or attainment of a predetermined fullness of the coalescing history storage.

As mentioned above there are a variety of ways in which the apparatus may be arranged to make use of the coalescing prediction generated by the coalescing prediction circuitry, but in some embodiments the apparatus further comprises a bypass path leading to the load handling circuitry and bypassing the coalescing circuitry, wherein the coalescing prediction circuitry is responsive to the coalescing prediction of not-coalescing to cause the load request to be provided to the load handling circuitry via the bypass path. Thus the provision of the bypass path enables load requests which have been identified as being not-coalescing to proceed directly to the load handling circuitry without being processed by the coalescing circuitry.

In some embodiments the apparatus further comprises: second load handling circuitry responsive to the load request specifying the data item to retrieve from the memory the series of data items comprising the data item identified by the load request; and load handling selection circuitry responsive to the coalescing prediction generated by the coalescing prediction circuitry to direct the load request either to the load handling circuitry via the pending load buffer circuitry or to the second load handling circuitry in dependence on the coalescing prediction. Thus according to such embodiments the load handling circuitry of the apparatus is "doubled up" (by the provision of the second load handling circuitry) and the load handling selection circuitry can then use the coalescing prediction to either provide the load request to the load handling circuitry via the pending load buffer circuitry (and thus be subject to potential coalescing via the processing of the coalescing circuitry) or directly to the second load handling circuitry (in order to not even attempt coalescing).

In some such embodiments the apparatus further comprises: a first load request issue queue to feed the pending load buffer circuitry; and a second load request issue queue to feed the second load handling circuitry, wherein load handling selection circuitry is responsive to the coalescing prediction generated by the coalescing prediction circuitry to direct the load request either to the first load request issue queue or to the second load request issue queue in dependence on the coalescing prediction. This arrangement thus enables a further level of decoupling of the paths leading to the (first) load handling circuitry and the second load handling circuitry, by preceding each of them with a dedicated issue queue, namely a "coalescing" issue queue for the (first) load handling circuitry path and a "non-coalescing" issue queue leading to the second load handling circuitry.

Coalescing predictions that are generated may also be stored in a variety of locations in the apparatus and in some embodiments, wherein the load request originates from a load instruction, the apparatus further comprises an instruction cache storage to store entries for frequently used instructions, wherein the instruction cache storage is arranged to store the coalescing prediction in association with the load instruction. This thus enables the coalescing prediction to be efficiently made use of, and with reduced latency, when the load instruction is encountered again.

The instruction cache storage may for example be a micro-op cache.

In some embodiments the apparatus further comprises data dependency determination circuitry to determine data dependencies between instructions, wherein the coalescing prediction circuitry is arranged to generate the coalescing prediction in dependence on at least one data dependency determined by the data dependency determination circuitry. Information relating to data dependency between instructions has been found, under some circumstances, to be useful to determine the likelihood of coalescing. Generally, there are some load instructions which provide input values directly (or with very little indirection) to other nearby load instructions, for loads which access pointers tend not to be coalescing. Accordingly, the information generated by a data dependency determination circuitry can provide a basis for categorising instructions as to whether they are coalescing or non-coalescing based on their dependencies and/or what dependent instructions might depend on them.

The data dependency determination circuitry may for example comprise register renaming circuitry.

In some embodiments the coalescing prediction circuitry is arranged to generate a coalescing prediction of coalescing for the load request by default. Since this is necessary to send load instructions through the coalescing hardware at least once in order to determine the probability of coalescing with other loads in flight, this corresponds to a default behaviour of the apparatus to be coalescing.

In one example herein there is a method of data processing comprising: buffering load requests prior to the load requests being carried out to retrieve from memory data items specified by the load requests, wherein carrying out a load request specifying a data item comprises retrieving from memory a series of data items comprising the data item identified by the load request; determining for the load request and a set of one or more other buffered load requests whether an address proximity condition is true, wherein the address proximity condition is true when all data items identified by the set of one or more other load requests are comprised within the series of data items; suppressing carrying out of the set of one or more other load requests when the address proximity condition is true; and generating a coalescing prediction for the load request based on previous handling of load requests.

In one example herein there is an apparatus comprising: means for buffering load requests prior to the load requests being carried out to retrieve from memory data items specified by the load requests, wherein carrying out a load request specifying a data item comprises retrieving from memory a series of data items comprising the data item identified by the load request; means for determining for the load request and a set of one or more other buffered load requests whether an address proximity condition is true, wherein the address proximity condition is true when all data items identified by the set of one or more other load requests are comprised within the series of data items; means for suppressing carrying out of the set of one or more other load requests when the address proximity condition is true; means for generating a coalescing prediction for the load request based on previous handling of load requests.

Some particular embodiments are now described with reference to the figures.

FIG. 1 schematically illustrates an apparatus 10 which is arranged to receive load requests (for example generated by data processing circuitry in response to load instructions identified in program code being executed) and to generate memory accesses in order to service those load requests. The apparatus 10 comprises a load unit 12, which generates the memory accesses in dependence on the load requests received. The apparatus 10 further comprises a pending loads buffer 14, in which received load requests are held before they are processed by the load unit 12. The apparatus 10 further comprises a coalescer (coalescing circuitry) 16, which receives content from the pending loads buffer 14 and, where possible, coalesces one or more load requests such that they are processed as a single item by the load unit 12 and in particular that only a single memory access request is generated. The coalescer 16 is arranged to determine whether two (or more) load requests can be coalesced based on an address proximity condition. The address proximity condition is defined based on the arrangement of the load unit 12, namely that in response to a given (individual) load request the load unit generates a memory access which causes a series of data items to be retrieved from memory. For example in some embodiments this series of data items may correspond to a cache line size in the wider data processing system of which the apparatus 10 forms part. That is to say, data is retrieved from memory in cache line size chunks. Thus, the opportunity to coalesce pending load requests arises when a second (or more) load request relates to a data item which will in any case be caused to be retrieved from memory by another (first) pending load request, by virtue of the fact that the first load request will cause retrieval of a series of data items, where the series of data items comprises the data item(s) specified by the second (or more) load request. In the example of cache line size data retrieval, the second (or more) load request relates to a data item within the same cache line as the first load request. Note that the labels "first" and "second" load request are only used here to distinguish between load requests and do not impose a necessary ordering on them when handled by the coalescer 16.

The apparatus 10 further comprises a coalescing predictor 18, which is arranged to receive indications of incoming load requests (e.g. at least a portion of the load instruction address) and on the basis of the information relating to the load request to generate a coalescing prediction based on previous encounters with this load request. The apparatus 10 further comprises path selection circuitry 20, which is arranged to pass incoming load requests either to the pending loads buffer 14 or directly to the load unit 12. This choice of path is made on the basis of the output of the coalescing predictor 18. Accordingly, on the basis of the manner in which a given load request has previously been handled by the apparatus 10, the path selection circuitry 20 chooses the route which the load request will take through the apparatus. Specifically, the load request can be passed directly to the load unit 12, when it is not expected that the load request will coalesce and therefore the processing associated with the path via pending loads buffer 14 and coalescer 16 can be avoided.

FIG. 2A schematically illustrates an apparatus 50 in some example embodiments. In a manner with which one of ordinary skill in the art will be familiar, the apparatus 50 is arranged in a pipelined manner to process instructions and thus comprises a sequence of stages, namely the fetch stage 52, the decode stage 54, the micro-op cache 56, the rename stage 58, and the instruction queue 60. It will further be understood by one of ordinary skill in the art that many other components and stages are possible, but the selection shown in FIG. 2A is merely representative for the purposes of understanding the present techniques. According to the illustrated arrangement the fetch stage 52 causes instructions from a sequence of instructions defined in program code to be retrieved from memory and these are passed to the decode stage 54 for decoding. Decoded instructions may be stored within the micro-op cache 56 and are then processed by the rename stage 58 (where the apparatus 50 is an out-of-order data processing apparatus). Instructions queued in the instruction queue 60 may then be passed to a number of destinations depending on their type, but the focus of the present disclosure is the handling of load instructions which generate load requests and such instructions pass from the instruction queue 60 to a register read stage 62 and then to an address generation stage 64. As such, it can be seen that the arrangement of the apparatus 50 comprises "early" address resolution (with respect to the operation of the load unit 72) and such early address resolution is useful in the context of the present techniques (i.e. when seeking to coalesce some pending loads) because it provides the apparatus with sufficient (simultaneous) visibility of the pending loads in flight (when held in the pending loads buffer 68) in order to make timely decisions regarding which loads to group together (coalesce). Indications of load instructions (which will cause load requests) are also passed from the decode stage 52 to the coalescing predictor 66, which on the basis of this indication of the load instruction (e.g. the load instruction address) is arranged to generate a coalescing prediction, i.e. whether or not this load instruction is expected to result in a load request which will coalesce with at least one other co-pending load request. This is done on the basis of the previous handling of load requests by the coalescing circuitry i.e. coalescer 70. This coalescing prediction is signalled to the address generation circuitry 64, which chooses a forward path for each load request on the basis of the coalescing prediction received. These forward paths lead to the load unit 72. The first path is via pending loads buffer 68 and the coalescer 70, and the second path leads directly from the address generation circuitry 64 to the load unit 72. Generally speaking therefore when a load request being handled by the address generation circuitry 64 is expected to coalesce then it is passed via the first path (via the pending loads buffer 68 and the coalescer 70, in order for coalescing with other pending loads held in the pending loads buffer 68 to be attempted). Alternatively when it is expected that the pending load will not coalesce, it is passed directly to the load unit 72. Since it is necessary to send pending loads through the coalescing hardware at least once in order to determine their probability of coalescing with other pending loads in flight, the default behaviour of the apparatus 50 is a coalescing attempt, i.e. initially all pending loads are deemed to be coalescing loads by default and will pass via the pending loads buffer 68 and the coalescer 70. However, once a pending load reaches the coalescer 70 and it is determined that it has failed to coalesce, then the coalescer 70 signals this failure to the coalescing predictor 66. The coalescing predictor 66 then builds up records indicative of those loads which have failed in the past to coalesce and on this basis when they are encountered again the signal from the coalescing predictor 66 to the address generation circuitry 64 can cause these non-coalescing load requests to bypass the coalescing circuitry 70 and proceed directly to the load unit 72. By reducing the number of pending loads which pass through the pending loads buffer, this also enables the structure of the pending loads buffer 68 and the search logic to compare multiple permutations of pending loads to be more simple.

Note also that the output of the coalescing predictor 66 is also shown in FIG. 2A as being passed to the decode circuitry 54. Thus the decode circuitry can on the one hand annotate the decoded load instruction with an indication of its coalescing prediction and on the other hand it may also keep a record of coalescing predictions for at least some frequently decoded load instructions, such that these may be decoded faster. The output of the coalescing predictor 66 may also be passed to any of the other pipeline stages (dashed lines in FIG. 2A), either for storage in association with certain load instructions (e.g. in the micro-op cache) or for annotation of the decoded load instruction with an indication of its coalescing prediction as it passed through the pipeline (which may for example for timing purposes be preferably performed downstream of the decode stage 54 in some cases). Various configurations of the coalescing predictor 66, and in particular the manner in which it stores information relating to how previous load requests have been handled are envisaged and will be discussed in more detail below with reference to FIGS. 4A, 4B, 5A, and 5B.

A pending load which reaches the load unit 72 then causes data retrieval. The apparatus comprises active loads storage 74 in which a record is kept of in-flight loads for which access to the memory system has been initiated, but not completed. The handling of a load request begins by the load unit 72 passing the request to the translation lookaside buffer (TLB) look-up and fault check circuitry 76 in order to perform the required look-up (for conversion from virtual to physical addressing) and to respond to any faults appropriately. Note that various cache levels could additionally be provided (not illustrated) which might either be virtually indexed or physically indexed and the access to the TLB might thus be modified accordingly. When the relevant series of data items is retrieved, for example following a data cache access, i.e. either as a result of a cache hit or by further access to further levels of the memory system (not illustrated), the data read and way multiplexing circuitry 78 handles the resulting data. The data item corresponding to the load request itself is extracted and passed to the selector 86. The series of data items resulting from the memory access is passed via the data buffer 80 to the de-coalescing and formatting circuitry 82. De-coalescing circuitry 82 receives an indication of a merged (coalesced) load request from the coalescer 70, where this indication shows which elements of the series of data item are to be additionally extracted (in order to provide the data items corresponding to one or more other load requests which have been suppressed by virtue of coalescing with the load request which was nominally handled). The de-coalescing and formatting circuitry 82 thus extracts the required multiple data items for coalesced load requests. The results are then passed via data buffer 84 to the other input of selector 86. Selector 86 thus receives one input from data buffer 84 and one input from data read and way multiplexing circuitry 78. The choice between these is controlled by an input provided by the load unit 72, indicating whether this is a coalesced load or not. The resulting data is then stored in the result cache 88, which can also provide an input to the register read stage 62 as part of its processing to determine addresses of the load requests which it receives.

FIG. 2B schematically illustrates the interaction of a pending loads buffer and coalescing circuitry according to some example embodiments. The pending loads buffer 90 comprises a number of entries each of which can hold a pending load (i.e. can hold information relating to a load which has been instructed, but not yet carried out). In the example of FIG. 2B the pending loads buffer 90 has eight entries, but in other embodiments the pending loads buffer could have more entries than this or could have fewer entries than this—the present techniques are not constrained to any particular number of entries in the pending loads buffer. Each entry is shown to comprise a main part 91 and a coalesced indication 92. The main part 91 holds the above-mentioned information relating to the respective load (in particular the address which the load will access) and the coalesced indication 92 is used to mark those loads which have been identified as coalescing with other loads in the pending loads buffer. In the example of FIG. 2B the oldest pending load in the buffer provides one part of an address comparison, whilst the other part is provided by the addresses of each of the other (seven) entries in the buffer. Address comparison circuitry 93 compares the address of the oldest pending load with the addresses of each of the other pending loads in the buffer. This comparison may only examine a portion of each address. For example where the load unit is configured to initiate loads from memory on a cache-line basis, an upper portion of the addresses can be compared to determine if two load addresses will be serviced by the retrieval of a single cache line which covers both of those addresses. The result of the address comparisons carried out by the address comparison circuitry 93 is signalled to the coalescing control circuitry 94. When there are no (close enough) matches between the address of the oldest pending load and the other pending loads, the coalescing control 94 passes the oldest pending load to the load unit and it is removed from the pending loads buffer (in practice the entry may simply be allowed to be overwritten in the pending loads buffer). The coalescing control 94 also signals to the coalescing predictor that this load failed to coalesce. However, when at least one (close enough) match between the address of the oldest pending load and the other pending loads is found, the coalescing control 94 updates the coalesced indication 92 for the one or more other pending loads which matched. These other pending loads are thus marked as having been coalesced with another load ahead of them in the pipeline of the pending loads buffer. When a pending load becomes the oldest pending load, the coalesced indication 92 is received by the coalescing control circuitry 94, which can then signal this load as a coalesced load to the load unit (as described above). Further address comparison of the already-coalesced load with the content of the pending loads buffer is nevertheless carried out, because in the interim one or more pending loads may have arrived which can also be coalesced.

FIG. 3 schematically illustrates an apparatus 100 in some example embodiments. Comparing to the schematic illustration of FIG. 2A, the example apparatus 100 of FIG. 3 does not show the pipeline stages which precede the instruction queue 102 (but this is merely for clarity and brevity of discussion here). Load instructions in the instruction queue 102 are indicated (e.g. by instruction address) to the coalescing predictor 104, which generates a coalescing prediction based on that indication. As in the example of FIG. 2A there are various ways in which the coalescing predictor could do this and in which it could store its information and those will be discussed in more detail below with reference to FIGS. 4A, 4B, 5A, and 5B. The coalescing prediction generated is signalled to the path selector 106, which then causes the load request to follow one of two paths through the apparatus 100. According to a first path, which a prediction of coalescing causes, the pending load request is passed to the coalescing issue queue (CIQ) 108. Alternatively a prediction of not-coalescing causes the path selector 106 to pass the load request to the non-coalescing issue queue (NCIQ) 110. Load requests from either the CIQ 108 or the NCIQ 110 make use of a register read stage 112. Thereafter load requests passing via the CIQ 108 are passed beyond the register read stage 112 to an address generation stage 114. Hereafter they enter the pending loads buffer 116 in which a number of pending load request are simultaneously held. The coalescer circuitry 118 references the content of the pending loads buffer 116 when determining whether a given load request can be coalesced. When it cannot this fact is signalled to the coalescing predictor 104, which builds up records of those load requests which have previously failed to coalesce, in order to generate its coalescent predictions. Pending load requests which are not suppressed by the coalescer 118 by virtue of having been coalesced with another load request are passed to the load unit 120 and the apparatus maintains a record of active loads in its active load storage 122. As in the case of the example embodiments described above with respect to FIG. 2A, the load unit 120 then passes pending loads to the TLB lookup and fault check circuitry 124. The data read and way multiplexing circuitry 126 extracts the data item corresponding to the load request itself and passed it to the selector 134. The series of data items resulting from the memory access is passed via the data buffer 128 to the de-coalescing and formatting circuitry 130. The de-coalescing and formatting circuitry 130 also receives input from the coalescer 118 indicating the nature of the coalescing performed (i.e. which data items should be extracted), such that it can then de-coalesce the required data items from the series of data items (e.g. cache line) retrieved. These de-coalesced data items are then passed via data buffer 132 to the selector 134.

Pending load requests which are predicted to be non-coalescing pass from the NCIQ 110 via the register read stage 112 directly to a load unit 140. Since these load requests are predicted to be non-coalescing, the need for early address generation is not present and therefore it is after the load unit 140 that the address generation stage 142 is placed, enabling the memory access required to service these load requests to be started earlier, thus avoiding the latency associated with the early address generation of the coalescing path. Load unit 140 also maintains a record of its active loads in active load storage 144. The result of the address generation 142 is passed to the TLB lookup and fault check circuitry 124 and then to the data read and way multiplexing circuitry 126. The results of non-coalescing requests are passed directly from the data read and way multiplexing circuitry 126 to the selector 134. Controlled by the load unit 140, the selector then passes one of its inputs to the result cache 136, the content of which may be made use of by the register read stage 112 in its role in address resolution.

FIG. 4A schematically illustrates in more detail the configuration of a coalescing predictor 150 according to some example embodiments. The coalescing predictor 150 is arranged to receive an indication of a load instruction, which in the illustrated embodiment comprises a subset of the address (bits [17:2]). This information is received by comparison circuitry 152, which receives another input from coalescing history storage 154. The comparison circuitry 152 compares the load instruction address information with content of the coalescing storage history 154 (i.e. the comparison circuitry 152 has visibility of all the history entries in the coalescing storage history 154 and compares to the incoming load instruction address) and on this basis generates a prediction for this load instruction (either of coalescing or of non-coalescing). Previous coalescing outcomes cause updates to be made to the content of the coalescing history storage 154. These may in principle be an explicit record of coalescing outcomes for load instructions previously encountered, or may be restricted to one particular outcome, e.g. non-coalescing outcomes. However, maintaining a record in the coalescing history storage of coalescing outcomes is also possible in other embodiments. Generally the coalescing history could be an explicit record of all coalescing outcomes, a record of non-coalescing outcomes, a record of coalescing outcomes, or a probabilistic representation of any of these.

FIG. 4B schematically illustrates further components of a coalescing predictor 160, which may in fact be the same coalescing predictor as the coalescing predictor 150 of FIG. 4A, but different functionality is focused on in FIG. 4B. In particular the coalescing predictor 160, in addition to coalescing history storage 162a-d, is shown to comprise update control 164. The update control may receive information from one or more possible inputs, shown in FIG. 4B as being a context switch signal, a timer, and a coalescing outcome (including information relating to the load instruction address). On this basis the update control 164 modifies the content of the coalescing history storage 162a-d. Generally the coalescing outcome causes an update to the coalescing history storage, which has already been described above (i.e. this could be an explicit record of all coalescing outcomes, a record of non-coalescing outcomes, a record of coalescing outcomes, or a probabilistic representation of any of these). The update control thus maintains the content of the coalescing history storage 162a-d. There are various ways in which the coalescing history storage content may be caused to be reset. One example is the lapse of a predetermined time period (indicated by the timer), since where the coalescing history storage will necessarily have finite capacity it may be the case that over time the "fullness" of the coalescing history storage 162a-d slowly leads to a degradation of its function. In order to mitigate against this the update control 164 can cause the content to be reset after a certain time period has elapsed. Alternatively or in addition it may be appropriate for the content of a coalescing history storage to be reset when the wider data processing system undergoes a context switch and thus the update control 164 can cause this reset on receipt of a context switch indication. The update control 164 also monitors the coalescing history storage 162a-d directly and can reset the content when a certain "fullness" of the storage is reached. The coalescing history storage is shown in FIG. 4B as comprising four parts: 162a, 162b, 162c, and 162d. These distinct portions of the coalescing history storage are used to store distinct sets of coalescing history data, which can for example be used to store coalescing history information relating to different process contexts. The update control 164 can instruct the coalescing history storage to switch between these different sets of history on a process context switch.

FIG. 5A schematically illustrates more detail of the operation of a coalescing predictor according to some example embodiments. In such embodiments a hash unit 170 is provided, which is arranged to generate a hash of instruction address information which it receives. The hash unit 170 receives load instruction address information from two sources, namely as an indication of incoming load instructions in an instruction queue, and as indications related to coalescing outcomes from a coalescing unit. The hash unit 170 makes use of hash key storage and sequencer circuitry 172 in order to generate its hash values. The provision of the sequencer 172 allows the hash unit to generate the hash value in multiple hashing stages, thus reducing the overall complexity of the hardware required to support the hashing function. Non-cryptographic hashes of this type can for example be quickly generated using an efficient hardware configuration using exclusive-or and/or shift operations. The output of the hash unit 170 is passed to the path selector 174 which determines the forward path for the hash information on the basis of whether a check is being performed with respect to the coalescing predictor storage (i.e. to generate a coalescing prediction) or whether a coalescing outcome is being used to modify the content of the storage. In the example of FIG. 5A the storage is a Bloom filter storage 178. Thus content of the Bloom filter storage 178 is updated on the basis of hashes generated with respect to coalescing outcomes. The Bloom filter shown is thus able to determine whether a particular load request is capable of being coalesced or whether there is a possibility that it might not coalesce. Then subsequently when a load instruction address (or portion thereof) is received by the cache unit 70 this information is passed to the comparison circuitry 176 which compares the instruction address information with content of the Bloom filter storage 178 and on that basis generates a coalescing prediction.

FIG. 5B schematically illustrates components of a data processing apparatus 180 which in the manner of some embodiments described above comprises a sequence of pipeline stages. These are shown to be a fetch stage 182, a decode stage 184, a micro-op cache stage 186, a rename stage 188, and an instruction queue 190. As in the manner of the example of embodiments described above, load instructions which are decoded by the decode stage 184 are also signalled to the coalescing predictor circuitry 192 in order for it to generate a coalescing prediction. This coalescing prediction is passed to the instruction queue 190, such that the onward path taken by the load request through the remainder of the apparatus (not illustrated, but in accordance with any of the embodiments described above) can be made. To note in particular with reference to FIG. 5B is that the coalescing predictor also receives an input from the rename stage 188. More generally the coalescing predictor 192 may be provided with input from any data dependency determination circuitry (of which the rename stage 188 is an example). This is done because it has been found that data dependencies of a load instruction comprise useful information which may be made useful for the purposes of determining whether a particular load request will coalesce or not. Specifically it has been found that when certain load instructions provide input values directly (or with very little indirection) to other co-pending load instructions, the loads which access pointers tend not to be coalescing. Accordingly, therefore data dependency information can be factored into the determination of the coalescing predictor in its generation of the coalescing prediction. FIG. 5B also illustrates an example in which the coalescing predictor is arranged to provide (dashed arrows in the figure) either or both of the decode stage 184 and the micro-op cache 186 with coalescing predictions for certain load instructions (as was described above with reference to FIG. 2A). In this arrangement, when the rename stage detects a load-load dependency chain (which as mentioned above has been found to notably reduce the likelihood of coalescing), not only will the rename stage 188 inform the coalescing predictor 192 to update itself to indicate that the first load should not coalesce, but when the coalescing predictor 192 has provided a prediction earlier in the pipe (e.g. at the decode stage or into the micro-op cache), the rename stage 188 may decide to override the prediction. More specifically the rename stage 188 can be arranged to determine whether the coalescing predictor 192 had an actual prediction for this load or whether the coalescing predictor 192 has assumed the default 'can-coalesce' prediction. Thus, the coalescing predictor may for example use a single bit of the coalescing prediction it provides to indicate either 'actual prediction' or 'default prediction' for this load. In the latter case the rename stage could override the prediction on the first load if it detects the load-load dependency chain.

FIG. 6 is a flow diagram illustrating a sequence of steps which are taken according to the method of some embodiments. The flow can be considered to begin at step 200 when a next load request is received. It is then determined at step 202 whether a non-coalescing prediction has previously been stored for this load request (i.e. for this load instruction). If it has then the flow proceeds directly to step 212 where the load request is carried out individually (i.e. without any attempt being made to coalesce it with other load requests). However if at step 202 it is found that there is not a non-coalescing prediction stored for this load request, then the flow proceeds to step 204, where the load request is added to a pending load buffer. It is then determined at step 206 whether the load request can be coalesced with other pending loads buffer content. If it cannot then the flow proceeds via step 207, where it is checked if the pending load buffer has sufficient content to allow a meaningful determination of "non-coalescing" to be made. This is done with reference to an occupancy threshold of the pending load buffer. Below this threshold it is defined that a determination of "non-coalescing" should not be made because there are not sufficient other loads held in the buffer with which the current load request can be compared. Thus when the current occupancy is not above the threshold, the flow proceeds to step 212 and the load is handled individually. The flow then returns to step 200. If however the current occupancy is above the threshold, the flow proceeds via step 208, where a non-coalescing prediction is stored for this load request and it is then handled at step 212, i.e. individually. Returning to a consideration of step 206, if however it is determined at step 206 that the load request can be coalesced with other pending load buffer content, then at step 210 the other "overlapping" load requests are suppressed. This may comprise the above referenced other pending load buffer content, or alternatively may comprise the load request itself, depending on the configuration employed and for example the order in which the load requests are proceeding through the pending loads buffer. For example it may be preferable for the oldest load request in a sequential pending load buffer to be actioned (to reduce latency) and those coalesced with it that follow it are to be suppressed, but this is not essential.

In brief overall summary, apparatuses and methods for handling load requests are disclosed. In response to a load request specifying a data item to retrieve from memory, a series of data items comprising the data item identified by the load request are retrieved. Load requests are buffered prior to the load requests being carried out. Coalescing circuitry determines for the load request and a set of one or more other load requests buffered in the pending load buffer circuitry whether an address proximity condition is true. The address proximity condition is true when all data items identified by the set of one or more other load requests are comprised within the series of data items. When the address proximity condition is true, the set of one or more other load requests are suppressed. Coalescing prediction circuitry generate a coalescing prediction for each load request based on previous handling of load requests by the coalescing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   first load handling circuitry, responsive to a given load request generated in response to an executed load instruction and identifying a given data item, to retrieve from memory a series of data items comprising the given data item identified by the given load request generated in response to the executed load instruction;
   pending load buffer circuitry to buffer a plurality of load requests prior to the plurality of load requests being carried out by the first load handling circuitry to retrieve from the memory data items identified by the plurality of load requests;
   coalescing circuitry to determine for the given load request generated in response to the executed load instruction, and a set of one or more other load requests buffered in the pending load buffer circuitry whether an address proximity condition is true, wherein the address proximity condition is true when all data items identified by the set of one or more other load requests are comprised within the series of data items,
   wherein the coalescing circuitry is, responsive to the address proximity condition being true, to suppress handling by the first load handling circuitry of the set of one or more other load requests prior to causing the given load request to be provided to the first load handling circuitry;
   coalescing prediction circuitry to generate a coalescing prediction for the given load request generated in response to the executed load instruction, based on previous handling of load requests by the coalescing circuitry;

second load handling circuitry responsive to the given load request identifying the given data item to retrieve from the memory the series of data items comprising the given data item identified by the load request; and load handling selection circuitry responsive to the coalescing prediction generated by the coalescing prediction circuitry to direct the given load request either to the first load handling circuitry via the pending load buffer circuitry or to the second load handling circuitry in dependence on the coalescing prediction.

2. The apparatus as claimed in claim 1, wherein the coalescing circuitry is, responsive to a coalescing prediction of not-coalescing, to suppress handling of the given load request by the coalescing circuitry.

3. The apparatus as claimed in claim 1, further comprising a feedback path from the coalescing circuitry to the coalescing prediction circuitry, wherein the coalescing circuitry is responsive to a validity of the address proximity condition to signal to the coalescing prediction circuitry via the feedback path a coalescing outcome dependent on the validity of the address proximity condition for the given load request.

4. The apparatus as claimed in claim 1, wherein the coalescing prediction circuitry comprises coalescing history storage to hold content dependent on the previous handling of load requests by the coalescing circuitry, and the coalescing prediction circuitry is arranged to generate the coalescing prediction for the given load request based on content of the coalescing history storage.

5. The apparatus as claimed in claim 4, wherein the content of the coalescing history storage comprises a probabilistic data structure.

6. The apparatus as claimed in claim 5, wherein the probabilistic data structure comprises a Bloom filter.

7. The apparatus as claimed in claim 5, further comprising hash generation circuitry to generate content of the probabilistic data structure, wherein the hash generation circuitry comprises a hash sequencer to generate the content of the probabilistic data structure in multiple hashing stages.

8. The apparatus as claimed in claim 4, further comprising reset circuitry to reset the content of the coalescing history storage in response to at least one of:
    elapse of a predetermined time period;
    receipt of a context switch indication; and/or
    attainment of a predetermined fullness of the coalescing history storage.

9. The apparatus as claimed in claim 1, further comprising a bypass path leading to the first load handling circuitry and bypassing the coalescing circuitry, wherein the coalescing prediction circuitry is responsive to the coalescing prediction of not-coalescing to cause the given load request to be provided to the first load handling circuitry via the bypass path.

10. The apparatus as claimed in claim 1, further comprising:
    a first load request issue queue to feed the pending load buffer circuitry; and
    a second load request issue queue to feed the second load handling circuitry,
    wherein the load handling selection circuitry is responsive to the coalescing prediction generated by the coalescing prediction circuitry to direct the given load request either to the first load request issue queue or to the second load request issue queue in dependence on the coalescing prediction.

11. The apparatus as claimed in claim 1, further comprising an instruction cache storage to store entries for instructions, wherein the instruction cache storage is arranged to store the coalescing prediction in association with the executed load instruction.

12. The apparatus as claimed in claim 11, wherein the instruction cache storage is a micro-operation cache.

13. The apparatus as claimed in claim 1, further comprising data dependency determination circuitry to determine data dependencies between instructions, wherein the coalescing prediction circuitry is arranged to generate the coalescing prediction in dependence on at least one data dependency determined by the data dependency determination circuitry.

14. The apparatus as claimed in claim 13, wherein the data dependency determination circuitry comprises register renaming circuitry.

15. The apparatus as claimed in claim 1, wherein the coalescing prediction circuitry is arranged to generate a coalescing prediction for the given load request by default.

16. A method of data processing comprising:
    buffering, in pending load buffer circuitry, a plurality of load requests prior to the plurality of load requests being carried out to retrieve from memory data items identified by the plurality of load requests, wherein carrying out a given load request generated in response to an executed load instruction and identifying a given data item comprises retrieving, in first load handling circuitry, from the memory a series of data items comprising the given data item identified by the given load request;
    determining for the given load request generated in response to the executed load instruction, and a set of one or more other buffered load requests whether an address proximity condition is true, wherein the address proximity condition is true when all data items identified by the set of one or more other buffered load requests are comprised within the series of data items;
    suppressing carrying out of the set of one or more other load requests when the address proximity condition is true prior to causing the given load request to be carried out;
    generating a coalescing prediction for the given load request generated in response to the executed load instruction, based on previous handling of load requests;
    responsive to the given load request, second load handling circuitry identifying the given data item to retrieve from the memory the series of data items comprising the given data item identified by the given load request; and
    responsive to the coalescing prediction, directing the given load request either to first load handling circuitry via the pending load buffer circuitry or to the second load handling circuitry in dependence on the coalescing prediction.

* * * * *